US012409986B2

(12) United States Patent
Li

(10) Patent No.: US 12,409,986 B2
(45) Date of Patent: Sep. 9, 2025

(54) CAP ASSEMBLY AND DROPPER ASSEMBLY AS WELL AS CONTAINER SYSTEM INCLUDING THE SAME

(71) Applicant: SILGAN DISPENSING SYSTEMS (WUXI) CO. LTD., Wuxi (CN)

(72) Inventor: Zhigang Li, Wuxi (CN)

(73) Assignee: Silgan Dispensing Systems (Wuxi) Co. Ltd., Wuxi (CN)

( * ) Notice: Subject to any disclaimer, the term of this patent is extended or adjusted under 35 U.S.C. 154(b) by 182 days.

(21) Appl. No.: 18/278,111

(22) PCT Filed: Mar. 21, 2022

(86) PCT No.: PCT/CN2022/081951
§ 371 (c)(1),
(2) Date: Aug. 21, 2023

(87) PCT Pub. No.: WO2022/199514
PCT Pub. Date: Sep. 29, 2022

(65) Prior Publication Data
US 2024/0116682 A1 Apr. 11, 2024

(30) Foreign Application Priority Data
Mar. 26, 2021 (CN) .......................... 202110324345.2

(51) Int. Cl.
*B65D 47/18* (2006.01)
*A45D 34/04* (2006.01)
(Continued)

(52) U.S. Cl.
CPC ............. *B65D 47/18* (2013.01); *A45D 34/04* (2013.01); *B01L 3/0272* (2013.01);
(Continued)

(58) Field of Classification Search
CPC .... B65D 47/18; B65D 41/0492; A45D 34/04; A45D 2200/055; B01L 3/0272;
(Continued)

(56) References Cited

U.S. PATENT DOCUMENTS 9,221,048 B2 * 12/2015 Duquet .................. B65D 47/18
9,351,556 B2 * 5/2016 Kim ........................ A45D 34/04
(Continued)

FOREIGN PATENT DOCUMENTS

EP  3147235      3/2017
EP  3147235 A2 * 3/2017 ............. B05B 11/02
(Continued)

*Primary Examiner* — David P Angwin
(74) *Attorney, Agent, or Firm* — Hinckley Allen & Snyder; Stephen Holmes

(57) ABSTRACT

The present invention relates to a cap assembly configured to be attached to a container, the cap assembly comprising: a top cap which includes a rest position and a pressable position; a piston rod connected to the top cap, the piston rod being connected to a piston at the bottom to actuate the piston to move vertically, the piston rod further comprising an inclined upper guiding surface; a deformable element bearing at the top end against the upper guiding surface of the piston rod so that the deformable element is movable along the upper guiding surface; a support which is vertically movable to move the top cap from the rest position to the pressable position, the support including an inclined lower guiding surface against which the bottom end of the deformable element is supported so that the deformable element is movable along the lower guiding surface; when the top cap is pressed, the piston rod moves downwards and actuates the piston to move downwards to dispense material from a dispensing chamber while forcing the deformable element to deform from an initial state and to move along the upper guiding surface and the lower guiding surface; and
(Continued)

when the top cap is released, the deformable element returns to the initial state.

19 Claims, 4 Drawing Sheets

(51) Int. Cl.
*B01L 3/02* (2006.01)
*B65D 41/04* (2006.01)
*G01F 11/02* (2006.01)

(52) U.S. Cl.
CPC ........ *B65D 41/0492* (2013.01); *G01F 11/028* (2013.01); *A45D 2200/055* (2013.01); *B01L 2300/042* (2013.01); *B01L 2400/0478* (2013.01); *B01L 2400/0481* (2013.01)

(58) Field of Classification Search
CPC ....... B01L 2300/042; B01L 2400/0478; B01L 2400/0481; G01F 11/028
See application file for complete search history.

(56) References Cited

U.S. PATENT DOCUMENTS

| | | | |
|---|---|---|---|
| 9,725,217 B2* | 8/2017 | Lee | ........................ B65D 47/06 |
| 2014/0020789 A1* | 1/2014 | Duquet | ................ B01L 3/0272 |
| | | | 141/24 |
| 2021/0206542 A1* | 7/2021 | Kim | ........................ A45D 34/00 |

FOREIGN PATENT DOCUMENTS

| EP | 3778418 | 2/2021 |
|---|---|---|
| WO | WO 2012/136938 | 10/2012 |
| WO | WO 2019/136004 | 7/2019 |

* cited by examiner

CAP ASSEMBLY AND DROPPER ASSEMBLY AS WELL AS CONTAINER SYSTEM INCLUDING THE SAME

CROSS-REFERENCE TO RELATED APPLICATIONS

This application claims the benefit of, and priority to, PCT Application No. PCT/CN2022/081951, entitled "CAP ASSEMBLY AND DROPPER ASSEMBLY AS WELL AS CONTAINER SYSTEM INCLUDING THE SAME," filed 21 Mar. 2022, which claims the benefit and priority of Chinese Application No. 202110324345.2, entitled "CAP ASSEMBLY AND DROPPER ASSEMBLY AS WELL AS CONTAINER SYSTEM INCLUDING THE SAME," filed 26 Mar. 2021, and incorporates each of the same herein by reference in their entireties.

TECHNICAL FIELD

The present invention generally relates to a cap assembly, and a dropper assembly and a container system including the same. More specifically, a dropper assembly including a cap assembly and a dropper is usually attached to a container, enabling a user to draw the material from the container and to dispense it through the dropper for use, e.g., a dropper-style cosmetic container.

BACKGROUND

Nowadays, many products use a dropper-style container to draw the product from the container through the dropper, and then dispense it to the desired location, such as essential oils, eye creams, serums, foundations, medicines and other products. Such products may be expensive and used only in a small quantity at one time. Moreover, it is necessary to try to avoid air entering the interior of the container or to avoid the contamination of the dropper during the dispensing process; otherwise it would make it possible that the product in the container goes bad or deteriorates. However, currently existing dropper caps usually include a rubber head which the user squeezes to expel air and releases to draw the product within the bottle. Then the dropper is removed from the bottle. The drawn product is discharged out of the dropper by squeezing again the rubber head.

During such drawing and dispensing processes, usually the user cannot accurately control the drawn and the expelled doses. On the one hand, if the amount drawn at a time is less than the required amount, the user needs to re-insert the dropper into the bottle to repeat the operation. Such repetitive operations are significantly cumbersome for the user, and the multiple operations of moving the dropper in and out of the bottle may cause contamination of the product in the bottle. On the other hand, if the amount drawn at a time is greater than the required amount, there is no way for the user to prevent expelling the excess dose. In addition, if the user inadvertently releases the rubber head slightly during use, the product would be expelled suddenly at an undesired location, resulting in a waste of the product and a poor customer experience.

Therefore, with such existing droppers, the user cannot control the required amount of the product, which would lead to cumbersome operations or a waste of the product.

SUMMARY OF THE INVENTION

The present invention aims to solve the problems in the prior art as mentioned above, and to provide a cap assembly that allows a user to control the expelled amount, as well as a dropper assembly and a container system including such a cap assembly.

One aspect of the present invention relates to a cap assembly configured to be attached to a container, the cap assembly comprising:

a top cap which includes a rest position and a pressable position;

a piston rod connected to the top cap, the piston rod being connected to a piston at the bottom to actuate the piston to move in a vertical direction, the piston rod further comprising an inclined upper guiding surface;

a deformable element bearing at the top end against the upper guiding surface of the piston rod, so that the deformable element is movable along the upper guiding surface; a support which is vertically movable to move the top cap from the rest position to the pressable position, the support including an inclined lower guiding surface against which the bottom end of the deformable element bears so that the deformable element is movable along the lower guiding surface;

wherein, when the top cap is pressed, the piston rod moves downwards and actuates the piston to move downwards to dispense material from a dispensing chamber, while forcing the deformable element to deform from an initial state and to move along the upper guiding surface and the lower guiding surface; and when the top cap is released, the deformable element returns to the initial state.

By pressing the top cap, the deformable element is caused to deform and to move along the upper guiding surface and the lower guiding surface, as well as pushing the piston rod and the piston to dispense the drawn material. On the one hand, the user can acknowledge a feedback between the extent to which the top cap is pushed and the amount that has been dispensed, so that he or she can conduct the dispensing by pressing the top cap according to the desired amount.

On the other hand, when the user releases the top cap, the deformable element returns to the initial state, and the piston rod and the piston also return to the upper position. Due to the action of pressure, the material would be drawn upward. Therefore, the dispensing of the material could be stopped immediately and would not continue to be expelled, thereby avoiding the waste as a result of excessive discharge of the material.

Furthermore, if the amount expelled by pressing once is less than the desired amount, the user can simply press multiple times until the desired amount is expelled, without having to re-insert the assembly into the container for repeated operations.

According to one aspect of the present invention, the cap assembly further comprises:

a rotatable outer cover located below the top cap;

a rotatable annular member located between the support and the outer cover, and connected to the outer cover, so that the annular member can rotate along with the outer cover;

at least one protrusion;

a guide rail for guiding the protrusion, the protrusion being movable in the guide rail between a first position and a second position;

wherein, when the outer cover and the annular member are rotated in a first direction, the protrusion moves from the first position to the second position in the guide rail, and at the same time causes the support to move upwards from the initial position, so that the piston rod, the piston, the deformable element and the top cap all move upwards until the top cap reaches the pressable position;

wherein, when the outer cover and the annular member are rotated in a second direction opposite to the first direction, the protrusion returns to the first position and causes the support to move down to the initial position, so that the piston rod, the piston, the deformable element and the top cap all move downward until the top cap returns to the rest position.

By rotation, the cap assembly can be easily opened. And at the same time, the material is drawn into the dropper and the dispensing chamber, and the top cap moves up to the pressable position. Therefore, after rotating the cap assembly, the user does not need to perform the step of squeezing the rubber head, which greatly simplifies the user's operation. The respective components can easily be returned to their original positions by rotation in the opposite direction.

According to one aspect of the present invention, the protrusion is provided on the outer side of the support, and the guide rail is provided on the annular member, wherein the first position is lower than the second position.

According to one aspect of the present invention, the protrusion is provided on the inner side of the annular member, and the guide rail is provided on the outer side of the support, wherein the first position is higher than the second position.

By means of the rotation of the outer cover and the annular member, the protrusion is caused to move within the guide rail. A pressure difference in the dispensing chamber can easily be created to draw the material, and at the same time the top cap is moved to the pressable position.

According to one aspect of the present invention, the guide rail includes a first horizontal section, an inclined section, and a second horizontal section, wherein the first horizontal section defines the first position of the protrusion, and the second horizontal section defines the second position of the protrusion.

According to one aspect of the present invention, the cap assembly comprises two symmetrically arranged protrusions, and each protrusion is respectively received in a corresponding guide rail.

According to one aspect of the present invention, the deformable element is C-shaped.

According to one aspect of the present invention, the deformable element is made of plastic.

According to one aspect of the present invention, the deformable element is made of an elastic material.

According to one aspect of the present invention, the deformable element includes a partially weakened region so that the deformable element changes in diameter when being subjected to a force.

The deformable element can be switched between an initial state and a deformed state to allow the user to accurately control the amount of the discharged material. Moreover, based on a feedback between the force with which the top cap is pressed to deform the deformable element and the amount of the discharged material, the user can know more precisely how to control in order to expel the desired amount.

According to one aspect of the present invention, the cap assembly further comprises:

a closure located at the bottom of the cap assembly and defining the dispensing chamber together with the piston, the closure internally including threads for threaded connection with the container, the closure further comprising an opening for communication with the dropper; and a gasket which seals the cap assembly and the container when the cap assembly is connected to the container.

Another aspect of the present invention relates to a dropper assembly comprising: the above-mentioned cap assembly;

at least one dropper including a first opening, a second opening, and a dropper body between the first opening and the second opening, the dropper sealingly connected to the bottom of the cap assembly and being in communication with the dispensing chamber.

An aspect of the present invention relates to a container system comprising: the above-mentioned dropper assembly; and a container defining a storage chamber for containing a material, wherein the dropper assembly is removably connected to the container and the dropper body protrudes into the container.

A container system with such a configuration allows the user to accurately control the discharged dose, whereby the user operation is greatly improved, a waste of the product is avoided, and contamination of the product inside the container is avoided as much as possible.

Another aspect of the present invention relates to a method of using the above-mentioned cap assembly, dropper assembly or container system.

Other forms, objectives, features, aspects, advantages and other embodiments of the present invention will be apparent from the detailed description and drawings provided herein.

BRIEF DESCRIPTION OF THE DRAWINGS

The disclosure of the present invention will be more clear with reference to the drawings. It should be understood that these drawings are only for illustrative purposes, and are not intended to limit the scope of protection of the present invention. In the drawings.

FIG. 5b is an exploded schematic view of the respective components in FIG. 5a.

DETAILED DESCRIPTION OF THE INVENTION

Figure 1:
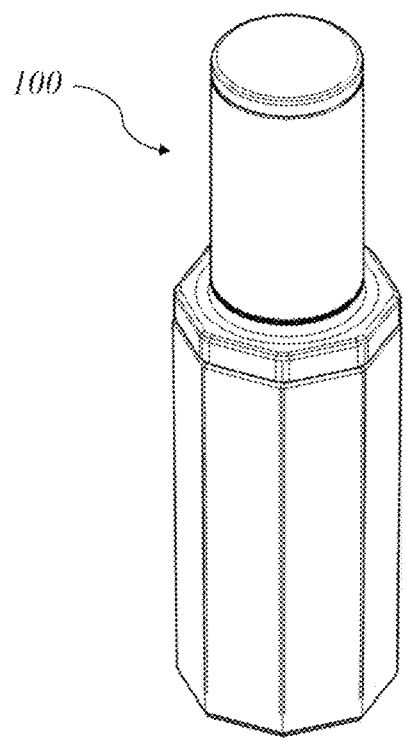
FIG. 1 is a schematic view of a container system according to the present application.

In the drawings, the same reference signs refer to the same or functionally equivalent components, unless otherwise specified. The components shown in the drawings are not all drawn to scale, but being intended to clearly illustrate the principles of the invention.

Figure 2:
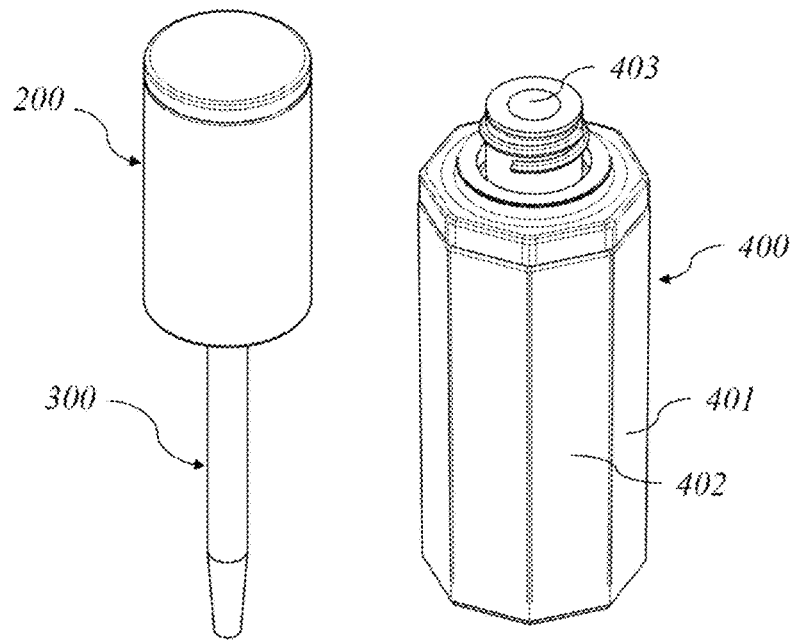
FIG. 2 is an exploded schematic view of a container system according to the present application.

FIG. 1 is a schematic view of a container system 100 according to the present invention. FIG. 2 is an exploded schematic view of the container system 100 in FIG. 1, the container system including a dropper assembly and a container 400, wherein the dropper assembly includes a cap assembly 200 and a dropper 300. The container 400 includes a container wall 401 and a storage chamber 402 defined by the container wall 401. The storage chamber 402 may store the desired materials as needed, such as liquids, viscous flowable materials, foams, gels, pastes, and the like. Materials may include, but are not limited to, essential oils, eye creams, serums, foundations, medicines, and the product that are suitable for dispensing through a dropper.

The container 400 as a whole may be made of plastic so that various components of the entire container system are recyclable, such as polypropylene (PP) and high density polyethylene (HDPE). The container 400 may have the form of a bottle as shown in FIGS. 1 and 2, but is not limited thereto. Similarly, in the embodiment shown, the container 400 and/or other components have a generally cylindrical shape. But it should be understood that different shapes are possible in other variations.

The container 400 includes a container opening 403 at the top, through which the dropper 300 can be moved into and/or out of the container. After insertion of the dropper assembly into the container 400, the bottom of the cap assembly 200 can be hermetically engaged with the top of the container 400 to ensure the sealing of the container, in any suitable manner such as by threaded engagement or form fit.

Figure 3:
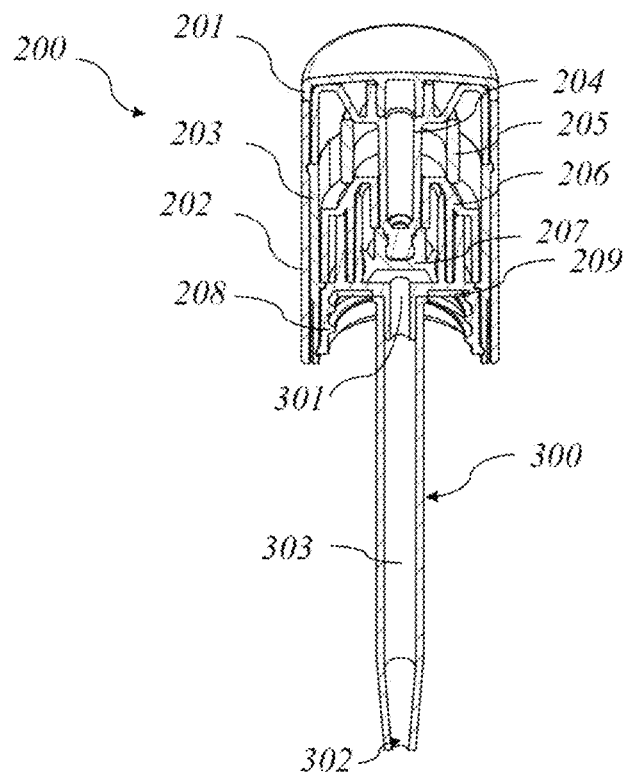
FIG. 3 is a schematic cross-sectional view of a dropper assembly according to the present application.

FIG. 3 is a schematic cross-sectional view of a dropper assembly according to an embodiment of the present application. The dropper assembly includes a cap assembly 200 and a dropper 300. The bottom end of the cap assembly 200 is tightly secured to the top end of the dropper 300. The dropper 300 includes a first opening 301, a second opening 302, and a dropper body 303 between the first opening 301 and the second opening 302. The dropper body 303 defines a passage for the material to pass through.

The top end of the cap assembly 200 includes a top cap 201. In the storage state of the container 400, the top cap 201 is in a rest position as part of the outer cap of the container. When the container 400 is opened, the top cap 201 is moved to a pressable position, such that it could function as a push button to dispense the material from the dispensing chamber and the dropper. An outer cover 202 is located below the top cap 201, and constitutes the outer cap covering the container together with the top cap 201. The user can bring the top cap 201 to the pressable position by rotating the outer cover 202 in a first direction, and return the top cap 201 to the rest position by rotating the outer cover 202 in a second direction opposite to the first direction.

An annular member 203 is provided inside the outer cover 202. The annular member 203 is secured to the outer cover 202 and can be rotated together with the outer cover 202. A piston rod 204 is provided below the top cap 201 and inside the outer cover 202. The piston rod 204 is connected to the top cap 201 and can move linearly along with the top cap. The bottom end of the piston rod 204 is connected to a piston 207, so as to actuate the piston to move in the vertical direction. Between the annular member 203 and the piston 207, there is a support 206 which can cooperate with the annular member 203. The support 206 is movable in a vertical direction relative to the annular member 203. A closure 208 is provided between the support 206 and the piston for tight connection to the top of the container. In one embodiment, the closure 208 may include internal threads for sealing engagement with external threads at the top of the container. In one embodiment, a gasket 209 may also be included within the closure 208 to ensure a hermetic seal at the joint when the closure and the container are joined together. The closure 208 and the piston 207 together define a dispensing chamber 210. The dispensing chamber 210 communicates with the first opening 301 of the dropper 300, so as to draw the material from the storage chamber 402 and dispense the material.

A deformable element 205 is provided between the piston rod 204 and the support 206. The top end of the deformable element 205 bears against the piston rod 204, and the bottom end of the deformable element 205 bears against the support 206. At rest, the deformable element 205 is in an initial state. The piston rod 204 includes an inclined upper guiding surface 211 along which the deformable element 205 can move. The support 206 may include an inclined lower guiding surface 212 along which the deformable element 205 can move. When the top cap 201 is in the pressable position, the top cap 201 being pressed, the force in the vertical direction is applied to the deformable element 205 via the piston rod, so that the deformable element deforms and moves along the upper guiding surface 211 and the lower surface 212. At this time, the piston rod 204 actuates the piston 207 to move downward to discharge material from the dispensing chamber 210, and the support 206 does not move. When the top cap is released, the deformable element 205 returns to its original state.

Through the cooperation of the annular member 203 and the support 206, the rotational movement of the outer cover and the annular member is converted to the linear movement of the support, thereby actuating the piston rod, the piston, the deformable element and the top cap to move in the vertical direction, so as to switch the top cap between a rest position and a pressable position. In particular, the annular member and the support can cooperate by means of a protrusion and a guide rail for guiding the protrusion. By rotating the outer cover and the annular member in different directions, the protrusion can be switched between a first position and a second position in the guide rail.

Figure 4:
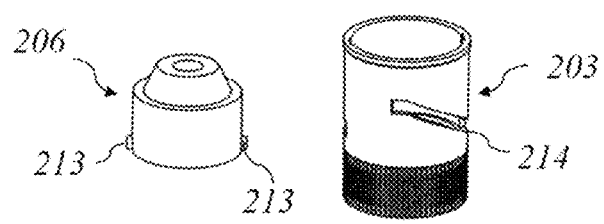
FIG. 4 schematically illustrates a support and an annular member according to one embodiment.

FIG. 4 schematically shows an annular member 203 and a support 206 according to one embodiment of the present invention, wherein the support 206 includes externally at least one, and preferably two, protrusion(s) 213. Preferably, the two protrusions are arranged symmetrically. Correspondingly, the annular member cooperating with the support 206 comprises at least one, and preferably two, guide rail(s) 214 for guiding the protrusion 213. Preferably, the two guide rails are arranged symmetrically. In particular, the guide rail 214 is provided on the inner side of the annular member 203 to receive the corresponding protrusion 213. By rotating the outer cover 202 and the annular member 203, the protrusion 213 can move between the first position and the second position in the guide rail 214. The protrusion 213 is at the first position in the guide rail 214 when the top cap is in the rest position, and is at a second position in the guide rail 214 when the top cap is in the pressable position.

In the embodiment shown in FIG. 4, the first position is lower than the second position. When the outer cover 202 and the annular member 203 are rotated in the first direction corresponding to opening, the protrusion 213 may slide from the first position to the second position, at which time the support 206 moves upwards from the initial position and actuates the piston rod 204, the piston 207, the deformable element 205 and the top cap 201 to move upwards. Conversely, when the outer cover 202 and the annular member 203 are rotated in the second direction corresponding to closing, the protrusion returns to the first position, and the support and the other respective components all return to their original positions.

In a further embodiment not shown, the annular member 203 includes internally at least one and preferably two protrusion(s). Preferably, the two protrusions are arranged symmetrically. Correspondingly, the support 206 comprises externally at least one guide rail, preferably two guide rails, for guiding the projection. Preferably, the two guide rails are arranged symmetrically. In this embodiment, the first position in which the protrusion is initially located is higher than the second position, so that when the outer cover and the annular member are rotated in the first direction, the protrusion moves from the first position to the second position. At the same time, the support 206 moves upwards from the initial position, and actuates the piston rod 204, the piston 207, the deformable element 205 and the top cap 201 to move upwards. When the outer cover 202 and the annular member 203 are rotated in the second direction corresponding to closing, the protrusion returns to the first position, and the support and the other respective components all return to their original positions.

The guide rail 214 includes a first horizontal section, an inclined section, and a second horizontal section, wherein the first horizontal section defines the first position of the protrusion 213, and the second horizontal section defines the second position of the protrusion 213. Other embodiments of the protrusion 213 and guide rail 214 not shown in the figures are also feasible, as long as the rotational movement of the outer cover can be converted to a linear movement of the piston rod.

Figure 5A:
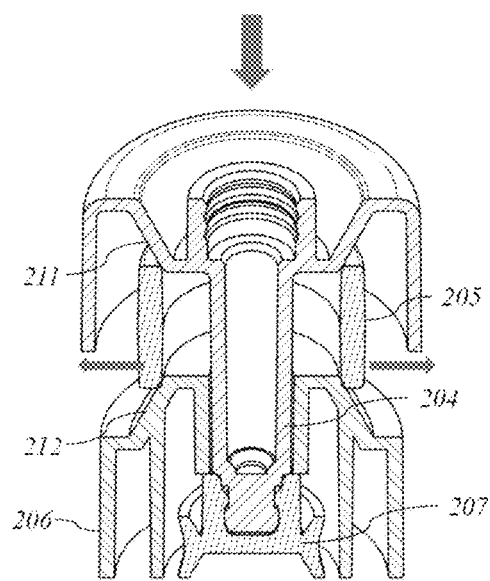
FIG. 5a schematically illustrates the cooperation between a piston rod, a deformable element and a support according to one embodiment.
Figure 5B:
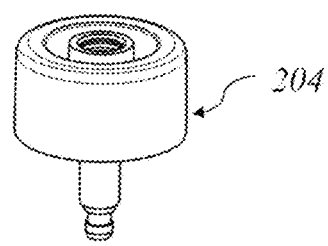
Figure 5B:
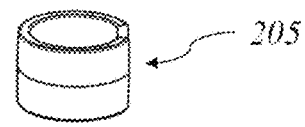
Figure 5B:
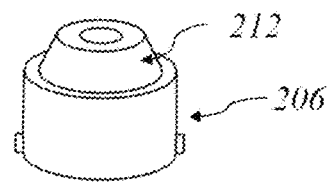
Figure 5B:

FIG. 5a schematically shows the assembly comprising the piston rod 204, the deformable element 205, the support 206 and the piston 207, and FIG. 5b is an exploded view of these components. The deformable element 205 may generally be annular or C-shaped. The annular or C-shaped deformable element 205 may deform when being subjected to a force in the vertical direction, so that its diameter changes to allow further downward movement of the piston rod and to actuate the piston. The deformable element 205 may be made of elastic material or plastic. Furthermore, the deformable element made of plastic material may facilitate the recycling of the entire container system compared to the metal material in the prior art. In further embodiments, the deformable element may include a partially weakened region so that it changes in diameter when being subjected to a force. In one embodiment, the deformable element may laterally comprise two legs, so that when the top cap is pressed, the two legs are forced to expand, and when the top cap is released, the two legs return to their original positions. Any embodiment for the deformable element is possible as long as it deforms when the piston rod is moved downwards and returns to its original status when the top cap is released.

Figures 6A, 6B:
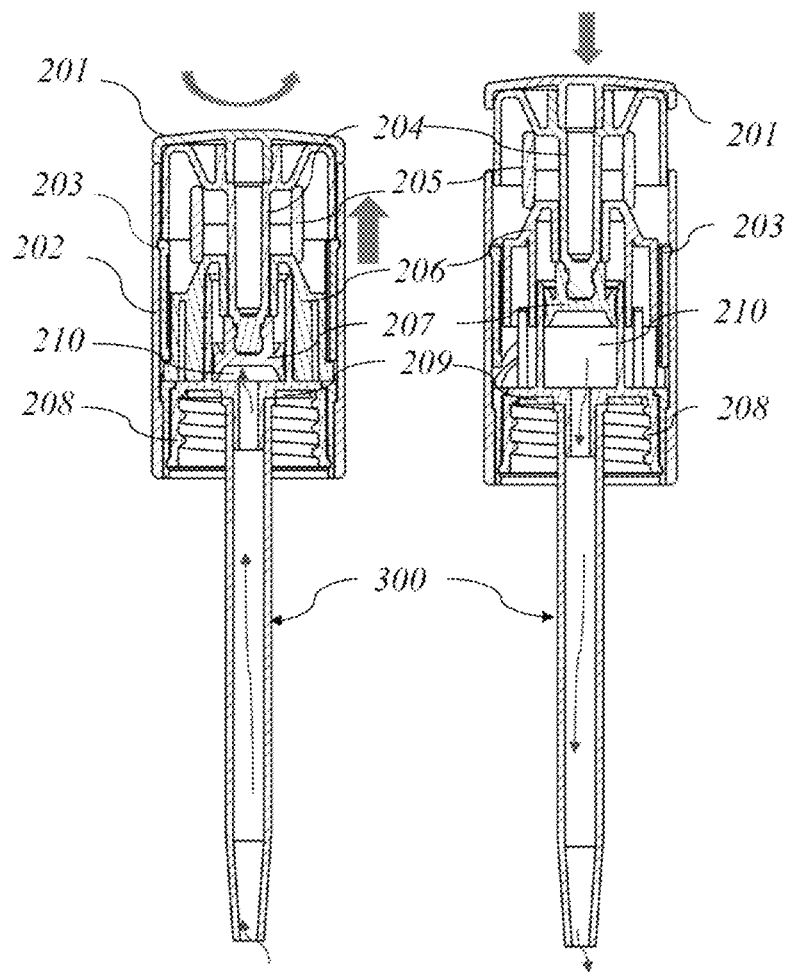
FIG. 6a schematically illustrates the operation of opening the dropper assembly by rotating the outer cover according to the present application.
FIG. 6b schematically illustrates the operation of the dropper assembly according to the present application after the outer cover is rotated and the top cap may be pressed to discharge the material.

The operation of the dropper assembly according to the present application is described below in conjunction with FIGS. 6a and 6b. As shown in FIG. 6a, when the outer cover 202 is rotated in a first direction, e.g., counterclockwise, the outer cover 202 actuates the annular member 203 to rotate together. Referring to the embodiment in FIG. 4, due to the action of the guide rail 214 provided on the inner side of the annular member 203, the rotation of the guide rail 214 forces the protrusion 213 on the support 206 to move out of the first position and move to the second, higher position along the guide rail 214. Due to the action of the protrusion 213, the support 206 moves upwards and actuates the piston rod 204, the deformable element 205, the top cap 201 and the piston 207 thereon to move upwards until the protrusion 213 reaches the second position. At this time, the top cap changes from the rest position to the pressable position. As the piston 207 moves upwards, due to the decreasing pressure in the dispensing chamber 210, the material is drawn from the container 400 into the dropper 300 and enters the dispensing chamber via the dropper 300. Meanwhile, the container and the dropper are disengaged, allowing the user to remove the dropper assembly from the container 400 to the desired location.

When the second opening of the dropper is adjacent to the position where the material needs to be dispensed, the user only needs to simply press the top cap 201. At this time, the top cap 201 actuates the piston rod 204 to move downwards, and actuates the piston 207 to move downwards as well, to thereby increase the pressure in the dispensing chamber 210 and expel the material in the dispensing chamber 210 and/or the dropper 300 to the desired location. During this process, the deformable element 205 deforms from its initial state, and increases in diameter to allow the piston rod to move downwards. At this time, the deformable element 205 moves along the upper guiding surface 211 and the lower guiding surface 212. Meanwhile, the support 206 does not change in position and stably supports the deformable element 205. Subsequently, after a desired amount of the material has been dispensed, as the user releases the top cap 201, the piston rod 204 and the piston 207 are actuated to move upwards, and the deformable element 205 returns to its original state. At this point, the material still in the dropper may be drawn upwards due to the pressure in the dispensing chamber 210 being decreased again.

By rotation in a direction, the container system according to the present invention can be easily opened, and at the same time the material is drawn into the dropper and/or the dispensing chamber, and the top cap is moved up to the pressable position. Thus, after rotating the outer cover, the user does not need to perform any step of squeezing the rubber head, which greatly simplifies the user's operation. The respective components can also be easily returned to their original positions by rotation in the opposite direction. Moreover, during the above-mentioned dispensing, the user can control the dispensed amount according to the extent of pressing, and would not cause a waste of the product due to unintentional release of the dispensing head. The user can acknowledge a feedback between the extent to which the top cap is pushed and the dispensed amount, so that he or she can perform the dispensing by pressing the top cap according to the desired amount. Even if the user inadvertently releases the top cap, the material would simply be drawn up again and remain in the dropper or dispensing chamber, and would not be expelled. In addition, if a sufficient amount of material has not been dispensed by one operation, the dispensing operation can be performed again by pressing the top cap again until the desired amount is dispensed.

Although it is shown in the figures that the counterclockwise direction corresponds to opening, the direction is not limited to the counterclockwise direction. Various directions in the embodiments of the present application may be changed as needed without departing from the scope of the present application. Although the present invention has been described in detail with reference to preferred embodiments, it will be understood that the present invention is not limited by the disclosed examples, and those skilled in the art can make many other modifications and variations based on them without departing from the scope of the present invention. It should be noted that the use of "a" throughout this application does not exclude the plurality, and "comprise" does not exclude other components. In addition, the components described in connection with different embodiments may be combined.

LIST OF REFERENCE SIGNS

100 Container system
200 Cap assembly
300 Dropper
400 Container
201 Top cap
202 Outer cover
203 Annular member
204 Piston rod
205 Deformable element
206 Support
207 Piston
208 Closure
209 Gasket
210 Dispensing chamber
211 Upper guiding surface
212 Lower guiding surface
213 Protrusion
214 Guide rail
301 First Opening
302 Second opening
303 Dropper body
401 Container wall
402 Storage chamber
403 Container opening

What is claimed is:

1. A cap assembly, comprising:
a top cap moveable between a rest position and a pressable position;
a piston rod connected to the top cap, comprising:
    a bottom end; and
    an inclined upper guiding surface;
a piston connected to the bottom end of the piston rod;
a deformable element comprising a top end of the deformable element and a bottom end of the deformable element, wherein the top end of the deformable element bears against the inclined upper guiding surface of the piston rod so that the deformable element is movable along the upper guiding surface;
a support which is vertically movable to move the top cap from the rest position to the pressable position, comprising an inclined lower guiding surface, wherein the bottom end of the deformable element bears against the lower guiding surface so that the deformable element is movable along the lower guiding surface;
wherein, when the top cap is in the pressable position and is pressed, the piston rod moves and moves the piston to dispense a material from the cap assembly, wherein said movement moves the deformable element along the upper guiding surface and the lower guiding surface, deforming the deformable element; and
wherein, the pressing of the top cap is released, the deformable element returns the top cap to the pressable position.

2. The cap assembly of claim 1, further comprising:
a rotatable outer cover located below the top cap;
a rotatable annular member located between the support and the outer cover and connected to the outer cover so that the annular member can rotate along with the outer cover;
at least one protrusion;
a guide rail for guiding the at least one protrusion, the at least one protrusion being movable in the guide rail between a first position and a second position;
wherein, when the outer cover and the annular member are rotated in a first direction, the at least one protrusion moves from the first position to the second position in the guide rail, and at the same time causes the support to move so that the piston rod, the piston, the deformable element and the top cap move such that the top cap reaches the pressable position;
wherein, when the outer cover and the annular member are rotated in a second direction opposite the first direction, the at least one protrusion moves from the second position to the first position in the guide rail and causes the support to move so that the piston rod, the piston, the deformable element and the top cap move such that the top cap returns to the rest position.

3. The cap assembly of claim 2, wherein; the at least one protrusion is provided on an outer side of the support, and the guide rail is provided on the annular member.

4. The cap assembly of claim 2, wherein; the at least one protrusion is provided on an inner side of the annular member, and the guide rail is provided on an outer side of the support.

5. The cap assembly of claim 2, wherein; the guide rail includes a first horizontal section, an inclined section, and a second horizontal section, wherein the first horizontal section defines the first position of the at least one protrusion, and the second horizontal section defines the second position of the at least one protrusion.

6. The cap assembly of claim 2, wherein the at least one protrusion further comprises two symmetrically arranged protrusions, and each protrusion is respectively received in a corresponding guide rail.

7. The cap assembly of any of claim 1, wherein the deformable element is C-shaped.

8. The cap assembly of any of claim 1, wherein the deformable element is made of plastic.

9. The cap assembly of any one of claim 1, wherein the deformable element is made of an elastic material.

10. The cap assembly of claim 1, wherein the deformable element comprises a partially weakened region so that the deformable element changes in diameter when being subjected to a force.

11. The cap assembly of claim 2, further comprising:
a closure comprising:
a dispensing chamber in which the piston is seated; and
internal threads for threaded connection to a container.

12. The cap assembly of claim 11, further comprising:
at least one dropper comprising a first opening, a second opening, and a dropper body between the first opening and the second opening, the dropper sealingly connected to the closure.

13. The cap assembly of claim 12, further comprising: a container defining a storage chamber for containing a material, wherein the cap assembly is removably connected to the container and the at least one dropper protrudes into the storage chamber of the container when the cap assembly is connected to the container.

14. A dropper assembly, comprising:
a cap assembly, comprising:
    a closure defining a dispensing chamber;
    a piston rod, comprising an inclined upper guiding surface;
    a support, comprising an inclined lower guiding surface;

a deformable element seated between the inclined lower guiding surface and the inclined upper guiding surface;
a piston connected to the piston rod and seated in the dispensing chamber;
a top cap covering at least a portion of the piston rod;
an annular member secured to the outer cover; and
an outer cover secured to the annular member, wherein the outer cover may be rotated in a first direction to move the support, the piston rod, the piston, and the deformable element to a rest position and rotated in a second direction to move the support, the piston rod, the piston, and the deformable element to a pressable position;

a dropper, comprising:
a first opening;
a second opening; and
a dropper body between the first opening and the second opening, wherein the first opening is connected to the closure.

15. The dropper assembly of claim 14, further comprising:
at least one guide rail; and
at least one protrusion seated in the at least one guide rail, wherein rotation of the outer cover moves the at least one protrusion along the at least one guide rail.

16. The dropper assembly of claim 15, wherein the at least one protrusion extends off an outer surface of the support and the at least one guide rail is formed in the annular member.

17. The dropper assembly of claim 14, wherein application of a force to the top cap when in the pressable position moves the piston rod towards the support, moves the piston in the dispensing chamber, and deforms the deformable element.

18. The dropper assembly of claim 14, wherein the dispensing chamber is in fluid communication with the dropper body.

19. The dropper assembly of claim 14, further comprising a container connected to the cap assembly.

* * * * *